(12) United States Patent
Wang et al.

(10) Patent No.: US 12,527,784 B2
(45) Date of Patent: Jan. 20, 2026

(54) COMBINED PHARMACEUTICAL COMPOSITION FOR TREATING SMALL CELL LUNG CANCER

(71) Applicants: Chia Tai Tianqing Pharmaceutical Group Co., Ltd., Lianyungang (CN); Nanjing Shunxin Pharmaceuticals Co., Ltd. Of Chiatai Tianqing Pharmaceutical Group, Nanjing (CN)

(72) Inventors: Shanchun Wang, Lianyungang (CN); Xunqiang Wang, Lianyungang (CN); Ding Yu, Lianyungang (CN); Wenwen Liu, Lianyungang (CN); Chao Shu, Lianyungang (CN); Mengxue Fan, Lianyungang (CN)

(73) Assignees: Chia Tai Tianqing Pharmaceutical Group Co., Ltd. and, Lianyungang (CN); Nanjing Shunxin Pharmaceuticals Co., Ltd. Of Chiatai Tianqing Pharmaceutical Group, Nanjing (CN)

( * ) Notice: Subject to any disclaimer, the term of this patent is extended or adjusted under 35 U.S.C. 154(b) by 1163 days.

(21) Appl. No.: 17/438,804

(22) PCT Filed: Mar. 13, 2020

(86) PCT No.: PCT/CN2020/079211
§ 371 (c)(1),
(2) Date: Sep. 13, 2021

(87) PCT Pub. No.: WO2020/187152
PCT Pub. Date: Sep. 24, 2020

(65) Prior Publication Data
US 2022/0175759 A1 Jun. 9, 2022

(30) Foreign Application Priority Data
Mar. 15, 2019 (CN) .......................... 201910198348.9

(51) Int. Cl.
| A61K 31/4709 | (2006.01) |
| A61K 9/00 | (2006.01) |
| A61K 39/395 | (2006.01) |
| A61P 35/00 | (2006.01) |

(52) U.S. Cl.
CPC ........ *A61K 31/4709* (2013.01); *A61K 9/0019* (2013.01); *A61K 39/3955* (2013.01); *A61P 35/00* (2018.01)

(58) Field of Classification Search
CPC ............. A61K 31/4709; A61K 9/0019; A61K 39/3955; A61K 2039/505; A61K 39/39558; A61K 45/06; A61P 35/00; C07K 16/2827
See application file for complete search history.

(56) References Cited

U.S. PATENT DOCUMENTS

| 10,888,559 B2* | 1/2021 | Wang ................ A61P 35/04 |
| 11,001,631 B2 | 5/2021 | Tavernier |
| 2016/0326138 A1 | 11/2016 | Chen et al. |
| 2022/0089742 A1* | 3/2022 | Zhang ................ A61P 35/00 |
| 2022/0160700 A1 | 5/2022 | Tian |

FOREIGN PATENT DOCUMENTS

| CN | 109071627 A | 12/2018 |
| WO | WO 2015/088847 A1 | 6/2015 |
| WO | WO 2016/022630 A1 | 2/2016 |
| WO | WO 2017/194782 A2 | 11/2017 |
| WO | WO 2017/194783 A1 | 11/2017 |
| WO | WO 2020/015703 A1 | 1/2020 |
| WO | WO 2020/015703 A9 | 1/2020 |

OTHER PUBLICATIONS

Almagro et al. Progress and Challenges in the Design and Clinical Development of Antibodies for Cancer Therapy. Front Immunol. Jan. 4, 2018;8:1751 (Year: 2018).*
Janeway, Immuno Biology The immune system in Health and Disease, 5th edition, 2001, section 7.8. (Year: 2001).*
Lydard et. al. Immunology, 2011, in Antibodies: Generation of diversity pp. 76-85. (Year: 2011).*
Meder et al. Combined VEGF and PD-L1 Blockade Displays Synergistic Treatment Effects in an Autochthonous Mouse Model of Small Cell Lung Cancer. Cancer Res. Aug. 1, 2018;78(15):4270-4281. (Year: 2018).*
Shen et al. Anlotinib: a novel multi-targeting tyrosine kinase inhibitor in clinical development. J Hematol Oncol. Sep. 19, 2018;11(1):120. (Year: 2018).*
Van Meerbeeck et al. Small-cell lung cancer. Lancet. Nov. 12, 2011;378(9804):1741-55. (Year: 2011).*
Syed YY. Anlotinib: First Global Approval. Drugs. Jul. 2018;78(10):1057-1062. (Year: 2018).*
Alsaab et al. PD-1 and PD-L1 Checkpoint Signaling Inhibition for Cancer Immunotherapy: Mechanism, Combinations, and Clinical Outcome. Front Pharmacol. Aug. 23, 2017;8:561. (Year: 2017).*
Frezzetti et al. VEGF as a potential target in lung cancer. Expert Opin Ther Targets. Oct. 2017;21(10):959-966 (Year: 2017).*
Sabari et al. Unravelling the biology of SCLC: implications for therapy. Nat Rev Clin Oncol 14, 549-561 (2017) (Year: 2017).*
International Search Report in International Application No. PCT/CN2020/079211, mailed Jun. 15, 2020 (8 pages).
Cheng, Y. et al., Abstract of "Anlotinib as Third-Line or Further-Line Treatment in Relapsed SCLC: A Multicentre, Randomized, Double-Blind Phase 2 Trial," Journal of Thoracic Oncology, 13(10S):S351-S353, Sep. 26, 2018 (2 pages).

(Continued)

*Primary Examiner* — Julie Wu
*Assistant Examiner* — Amber K Faust
(74) *Attorney, Agent, or Firm* — NIXON PEABODY LLP

(57) ABSTRACT

The present invention relates to the field of biomedicine and relates to a combined pharmaceutical composition used for treating small cell lung cancer, the composition comprising an anti-PD-L1 antibody and anlotinib, and having good anti-small cell lung cancer activity.

13 Claims, No Drawings
Specification includes a Sequence Listing.

(56) References Cited

OTHER PUBLICATIONS

Calles, A. et al., "The role of immunotherapy in small cell lung cancer," Clinical and Translational Oncology, 21(8):961-976, doi: 10.1007/s12094-018-02011-9, Jan. 12, 2019 (16 pages).

Small Pill, "Chia Tai Tianqing starts a clinical trial of the combination of class 1.1 new drug Anlotinib and PD-L1 monoclonal antibody," Sina Medicine News, Feb. 25, 2019 (5 pages w/English translation).

Extended European Search Report in European Application No. 20774316.2, mailed Dec. 13, 2022 (12 pages).

Meder, Lydia et al., "Combined VEGF and PD-L1 Blockade Displays Synergistic Treatment Effects in an Autochthonous Mouse Model of Small Cell Lung Cancer," Tumor Biology and Immunology Cancer Research; DOI: 1158/0008-5472CAN-17-2176 published OnlineFirst May 18, 2018 (13 pages).

Cheng, Y., et al., "OA13.03 Anlotinib as Third-Line or Further-Line Treatment in Relapsed SCLC: A Multicentre, Randomized, Double-Blind Phase 2 Trial—Journal of Thoracic Oncology," Sep. 28, 2018 (Sep. 28, 2018), XP93004036, URL: https://www.jto.org/article/S1556-0864 (18) 31266-8/fulltext#relatedArticles (2 pages).

Horn et al. "First-Line Atezolizumab plus Chemotherapy in Extensive-Stage Small-Cell Lung Cancer", The New England Journal of Medicine, 379, Sep. 25, 2018, 2220-2229.

* cited by examiner

COMBINED PHARMACEUTICAL COMPOSITION FOR TREATING SMALL CELL LUNG CANCER

REFERENCES TO RELATED APPLICATIONS

The present application is a U.S. national stage of PCT/CN2020/079211, filed on Mar. 13, 2020, which claims the benefit and priority to Chinese Patent Application No. 201910198348.9 filed with the National Intellectual Property Administration, PRC on Mar. 15, 2019, which are incorporated herein by reference in their entireties.

SEQUENCE LISTING

The instant application contains a Sequence Listing which has been submitted in ASCII format via EFS-Web and is hereby incorporated by reference in its entirety. Said ASCII copy, created on Sep. 13, 2021, is named 059541-081USPX-SL.txt and is 21,578 bytes in size.

TECHNICAL FIELD

The present application relates to the field of biological therapies, and particularly to a combined pharmaceutical composition for use in treating small cell lung cancer.

BACKGROUND

Tyrosine kinase is a group of enzymes which catalyze the phosphorylation of tyrosine residues in proteins. It plays an important role in intracellular signal transduction, takes part in adjustment, signaling and development of normal cells, and is closely related to proliferation, differentiation, migration and apoptosis of tumor cells. Many receptor tyrosine kinases are related to tumorigenesis and can be classified as epidermal growth factor receptor (EGFR), platelet-derived growth factor receptor (PDGFR), vascular endothelial growth factor receptor (VEGFR), fibroblast growth factor receptor (FGFR) and the like according to the structure of extracellular domain.

PD-L1 (programmed death-ligand 1), also known as CD247 or B7-H1, is a ligand for programmed cell death protein 1 (PD-1). PD-L1 is highly expressed on the surface of various tumor cells, and the malignant degree and poor prognosis of tumors are closely related to the expression level of PD-L1. In a tumor microenvironment, PD-L1 on cancer cell surface inhibits the activation and proliferation of T cells, induces effector T cell exhaustion or anergy, promotes apoptosis of T cells, and stimulates the differentiation of helper T cells into regulatory T cells by binding to PD-1 or CD80 on T cell surface, thus preventing the killing effect of T cells on tumor cells. Anti-PD-L1 antibodies can prevent the related negative regulation signals from being initiated and transducted by blocking the interaction of PD-L1 with PD-1 and CD80, thereby avoiding inhibited activity of effector T cells in tumor microenvironment and enabling T cells to exert the functions of killing and inhibiting tumor cells. Anti-PD-L1 antibodies can directly act on tumor tissues, providing the antibodies with high specificity and safety.

Small cell lung cancer (SCLC) is the type of lung cancer featuring highest-grade malignancy, and is characterized by rapid progress, early metastasis, easy recurrence and the like. SCLC is responsible for about 15-20% of new lung cancer cases, and has a close relationship with long-term smoking. The median survival time (MST) of untreated SCLC patients is only 2-4 months; after treatment, the MST of the limited-stage patients is about 15-20 months, and the MST of the extensive-stage patients is 8-13 months. SCLC is sensitive to chemotherapy and radiotherapy compared with other types of lung cancers; however, many therapeutic challenges remain due to high recurrence rate and drug resistance rate (Development of Diagnosis and Treatment for Small Cell Lung Cancer, *Chinese Journal of Lung Cancer*, October 2011, Vol. 14, No. 10, pp. 819-824).

WO2016022630 discloses anti-PD-L1 antibodies, which have higher affinity to PD-L1, and can significantly inhibit the interaction between PD-L1 and PD-1 on cell surface and promote T cells to secrete IL-2 and INF-γ.

Although patients with proliferative diseases (for example, cancers) have many treatment options, there's still a need for more effective pharmaceutical agents for clinical use, in particular combined use of more than one drug.

BRIEF SUMMARY

In one aspect, the present application provides a combined pharmaceutical composition for use in treating small cell lung cancer comprising an anti-PD-L1 antibody and anlotinib.

Furthermore, anlotinib is in the form of a free base, or in the form of a pharmaceutically acceptable salt thereof. For example, the pharmaceutically acceptable salt of anlotinib can be hydrochloride or dihydrochloride.

Furthermore, the anti-PD-L1 antibody comprises an amino acid sequence as follows: a heavy chain CDR1 region having at least 80% homology to an amino acid sequence set forth in SEQ ID NO: 1 or SEQ ID NO: 4; a heavy chain CDR2 region having at least 80% homology to an amino acid sequence set forth in SEQ ID NO: 2 or SEQ ID NO: 5; a heavy chain CDR3 region having at least 80% homology to an amino acid sequence set forth in SEQ ID NO: 3 or SEQ ID NO: 6; a light chain CDR1 region having at least 80% homology to an amino acid sequence set forth in SEQ ID NO: 7 or SEQ ID NO: 10; a light chain CDR2 region having at least 80% homology to an amino acid sequence set forth in SEQ ID NO: 8 or SEQ ID NO: 11; and a light chain CDR3 region having at least 80% homology to an amino acid sequence set forth in SEQ ID NO: 9 or SEQ ID NO: 12. Still further, the anti-PD-L1 antibody comprises an amino acid sequence as follows: a heavy chain CDR1 region selected from the group consisting of SEQ ID NO: 1 and SEQ ID NO: 4; a heavy chain CDR2 region selected from the group consisting of SEQ ID NO: 2 and SEQ ID NO: 5; a heavy chain CDR3 region selected from the group consisting of SEQ ID NO: 3 and SEQ ID NO: 6; a light chain CDR1 region selected from the group consisting of SEQ ID NO: 7 and SEQ ID NO: 10; a light chain CDR2 region selected from the group consisting of SEQ ID NO: 8 and SEQ ID NO: 11; and a light chain CDR3 region selected from the group consisting of SEQ ID NO: 9 and SEQ ID NO: 12. Still further, the anti-PD-L1 antibody comprises: a heavy chain CDR1 region having an amino acid sequence set forth in SEQ ID NO: 1; a heavy chain CDR2 region having an amino acid sequence set forth in SEQ ID NO: 2; a heavy chain CDR3 region having an amino acid sequence set forth in SEQ ID NO: 3; a light chain CDR1 region having an amino acid sequence set forth in SEQ ID NO: 7; a light chain CDR2 region having an amino acid sequence set forth in SEQ ID NO: 8; and a light chain CDR3 region having an amino acid sequence set forth in SEQ ID NO: 9. Still further, the anti-PD-L1 antibody comprises an amino acid sequence as follows: a heavy chain variable region having at least 80% homology to an amino acid sequence set forth in SEQ ID NO: 13 or SEQ ID NO: 14; and a light chain variable region having at least 80% homology to an amino acid sequence set forth in SEQ ID NO: 15 or SEQ ID NO: 16. Still further, the anti-PD-L1 antibody comprises: a heavy chain variable region selected from the group consisting of heavy chain variable regions of humanized antibodies hu13C5-hIgG1, hu13C5-hIgG4, hu5G11-hIgG1 and hu5G11-hIgG4; and a light chain variable region selected from the group consisting of light chain variable regions of humanized antibodies hu13C5-hIgG1, hu13C5-hIgG4, hu5G11-hIgG1 and hu5G11-hIgG4.

Furthermore, the combined pharmaceutical composition disclosed herein is packaged in a kit further comprising an instruction for combined use of the anti-PD-L1 antibody and anlotinib in treating small cell lung cancer.

Furthermore, the present application provides a combined pharmaceutical composition, comprising a pharmaceutical composition containing 600-2400 mg of the anti-PD-L1 antibody and a pharmaceutical composition containing anlotinib in a single dose of 6 mg, 8 mg, 10 mg and/or 12 mg, wherein the pharmaceutical composition containing the anti-PD-L1 antibody is in a single dose or multiple doses.

Furthermore, the present application provides a combined pharmaceutical composition, comprising a pharmaceutical composition containing 600-2400 mg of the anti-PD-L1 antibody in multiple doses and a pharmaceutical composition containing anlotinib in a single dose of 6 mg, 8 mg, 10 mg and/or 12 mg.

Furthermore, the present application provides a combined pharmaceutical composition, which is a formulation suitable for administration within a single treatment cycle (e.g., a 21-day treatment cycle), and comprises a pharmaceutical composition containing 600-2400 mg of the anti-PD-L1 antibody and a pharmaceutical composition containing 84-168 mg of anlotinib.

Furthermore, the present application provides a combined pharmaceutical composition comprising the anti-PD-L1 antibody and anlotinib in a weight ratio of (0.35-29):1, preferably (3.5-29):1, more preferably (3.5-14.5):1, and most preferably (7-14.5):1, wherein the anti-PD-L1 antibody and anlotinib are packaged either separately or together, and wherein anlotinib can be packaged in multiple aliquots (e.g., 2 aliquots, 7 aliquots, 14 aliquots, 28 aliquots, or more); the anti-PD-L1 antibody can be packaged in a single or multiple aliquots (e.g., 2 aliquots, 4 aliquots, or more).

In another aspect, the present application further provides use of the combined pharmaceutical composition disclosed herein in preparing a medicament for use in treating small cell lung cancer. Alternatively, the present application further provides a method for treating small cell lung cancer, comprising administering to a subject an effective amount of the combined pharmaceutical composition disclosed herein. The present application further provides use of the combined pharmaceutical composition disclosed herein in treating small cell lung cancer. The combined pharmaceutical composition comprises an anti-PD-L1 antibody and anlotinib.

In another aspect, the present application further provides use of the anti-PD-L1 antibody and anlotinib in preparing a medicament for use in treating small cell lung cancer. Alternatively, the present application further provides a method for treating small cell lung cancer, comprising administering to a subject an effective amount of the anti-PD-L1 antibody and anlotinib. The present application further provides use of a combination of the anti-PD-L1 antibody and anlotinib in treating small cell lung cancer. Alternatively, the present application further provides a combination of the anti-PD-L1 antibody and anlotinib for use in treating small cell lung cancer.

Furthermore, the anti-PD-L1 antibody and anlotinib are each in a form of a pharmaceutical composition that can be administered simultaneously, sequentially or at intervals. Still further, the anti-PD-L1 antibody is administered once every week, every 2 weeks, every 3 weeks, or every 4 weeks; preferably, the anti-PD-L1 antibody is administered at a dose of 600-2400 mg each time. Still further, anlotinib is administered at a dose of 6 mg, 8 mg, 10 mg, or 12 mg once daily with a regimen of 2-week treatment plus 1-week interruption.

In addition, the present application provides a kit for use in treating small cell lung cancer, comprising a pharmaceutical composition of an anti-PD-L1 antibody, a pharmaceutical composition of anlotinib, and an instruction for combined use of the anti-PD-L1 antibody and anlotinib in treating small cell lung cancer.

Furthermore, the kit is suitable for administration within a single treatment cycle (e.g., a 21-day treatment cycle), and comprises a pharmaceutical composition containing 600-2400 mg of the anti-PD-L1 antibody and a pharmaceutical composition containing 84-168 mg of anlotinib.

SUMMARY

In one aspect, the present application provides a combined pharmaceutical composition for use in treating small cell lung cancer comprising an anti-PD-L1 antibody and anlotinib.

In some embodiments of the present application, the combined pharmaceutical composition comprises a pharmaceutical composition of the anti-PD-L1 antibody and a pharmaceutical composition of anlotinib.

In some embodiments of the present application, the combined pharmaceutical composition is packaged in a kit further comprising an instruction for combined use of the anti-PD-L1 antibody and anlotinib in treating small cell lung cancer.

In some embodiments, provided is a combined pharmaceutical composition for use in treating small cell lung cancer, comprising a pharmaceutical composition containing 600-2400 mg of the anti-PD-L1 antibody and a pharmaceutical composition containing anlotinib in a single dose of 6 mg, 8 mg, 10 mg and/or 12 mg, wherein the pharmaceutical composition containing the anti-PD-L1 antibody is in a single dose or multiple doses.

In some embodiments, provided is a combined pharmaceutical composition for use in treating small cell lung cancer, comprising a pharmaceutical composition containing 600-2400 mg of the anti-PD-L1 antibody in multiple doses and a pharmaceutical composition containing anlotinib in a single dose of 6 mg, 8 mg, 10 mg and/or 12 mg.

In some embodiments, provided is a combined pharmaceutical composition for use in treating small cell lung cancer, comprising the anti-PD-L1 antibody and anlotinib in a weight ratio of (0.35-29):1, preferably (3.5-29):1, more preferably (3.5-14.5):1, and most preferably (7-14.5):1, wherein the anti-PD-L1 antibody and anlotinib are packaged either separately or together, and wherein anlotinib can be packaged in multiple aliquots (e.g., 2 aliquots, 7 aliquots, 14 aliquots, 28 aliquots, or more).

In some embodiments, provided is a combined pharmaceutical composition for use in treating small cell lung cancer, comprising a pharmaceutical composition of the anti-PD-L1 antibody and a pharmaceutical composition of anlotinib, wherein the pharmaceutical composition of the anti-PD-L1 antibody is formulated to be suitable for administering a single dose or multiple doses of 600-2400 mg of anti-PD-L1 antibody to the patient at the first administration, and the pharmaceutical composition of anlotinib is formulated to be suitable for administering to a patient a single dose of 6 mg, 8 mg, 10 mg, and/or 12 mg of anlotinib daily for 14 consecutive days.

In some embodiments, provided is a combined pharmaceutical composition for use in treating small cell lung cancer, comprising a pharmaceutical composition of the anti-PD-L1 antibody containing 10-60 mg/mL anti-PD-L1 antibody and a pharmaceutical composition containing anlotinib in a single dose of 6 mg, 8 mg, 10 mg and/or 12 mg.

In some embodiments, provided is a combined pharmaceutical composition for use in treating small cell lung cancer, comprising a pharmaceutical composition of the anti-PD-L1 antibody containing 10 mg/mL anti-PD-L1 antibody and a pharmaceutical composition containing anlotinib in a single dose of 8 mg and/or 10 mg and/or 12 mg.

In some embodiments, provided is a combined pharmaceutical composition for use in treating small cell lung cancer, comprising a pharmaceutical composition containing 1200 mg of the anti-PD-L1 antibody in multiple doses and a pharmaceutical composition containing anlotinib in a single dose of 8 mg and/or 10 mg and/or 12 mg.

In another aspect, the present application further provides use of the combined pharmaceutical composition in preparing a medicament for use in treating small cell lung cancer. The present application further provides a method for treating small cell lung cancer, comprising administering to a subject an effective amount of the combined pharmaceutical composition disclosed herein. The present application further provides use of the combined pharmaceutical composition in treating small cell lung cancer. In some embodiments, the combined pharmaceutical composition comprises an anti-PD-L1 antibody and anlotinib.

In another aspect, the present application further provides use of the anti-PD-L1 antibody and anlotinib in preparing a medicament for use in treating small cell lung cancer. The present application further provides a method for treating small cell lung cancer, comprising administering to a subject an effective amount of the anti-PD-L1 antibody and anlotinib. The present application further provides use of a combination of the anti-PD-L1 antibody and anlotinib in treating small cell lung cancer. The present application further provides a combination of the anti-PD-L1 antibody and anlotinib for use in treating small cell lung cancer.

In yet another aspect, the present application provides a kit for use in treating small cell lung cancer, comprising a pharmaceutical composition of an anti-PD-L1 antibody, a pharmaceutical composition of anlotinib, and an instruction for combined use of the anti-PD-L1 antibody and anlotinib in treating small cell lung cancer.

In yet another aspect, the present application further provides an anti-PD-L1 antibody for use in treating small cell lung cancer. The present application further provides a method for treating small cell lung cancer, comprising administering to a subject an effective amount of the anti-PD-L1 antibody disclosed herein. The present application further provides use of the anti-PD-L1 antibody in treating small cell lung cancer. The present application further provides use of the anti-PD-L1 antibody in preparing a medicament for use in treating small cell lung cancer.

Dosage Regimen/Treatment Regimen of Combined Pharmaceutical Composition

In one aspect, the present application provides a combined pharmaceutical composition comprising an anti-PD-L1 antibody and anlotinib.

In some embodiments of the present application, for the above use or methods for treatment, the anti-PD-L1 antibody and anlotinib are each in the form of a pharmaceutical composition that can be administered simultaneously, sequentially or at intervals.

In some embodiments of the present application, for the above use or methods for treatment, the anti-PD-L1 antibody and anlotinib are separately administered at intervals. In some embodiments, the antibody and anlotinib are administered separately on the same or different regimens. In some embodiments, the two are separately administered on different regimens.

In some embodiments of the present application, for the above use or methods for treatment, the anti-PD-L1 antibody can be administered once every week (q1w), every 2 weeks (q2w), every 3 weeks (q3w), or every 4 weeks (q4w). In one specific embodiment, the anti-PD-L1 antibody is administered once every 3 weeks. In some embodiments, the anti-PD-L1 antibody is administered at a dose of 600-2400 mg each time.

Anlotinib can be administered at a dose of 6 mg, 8 mg, 10 mg, or 12 mg once daily with a regimen of continuous 2-week treatment plus 1-week interruption.

In some embodiments, the anti-PD-L1 antibody and anlotinib have the same or different treatment cycles. In some specific embodiments, the anti-PD-L1 antibody and anlotinib have the same treatment cycle, e.g., a 1-week, 2-week, 3-week or 4-week treatment cycle.

In some embodiments of the present application, for the use or methods for treatment, a treatment cycle takes 21 days; the anti-PD-L1 antibody is administered on the first day of each cycle and anlotinib is administered daily on days 1-14 of each cycle. In one specific embodiment, the anti-PD-L1 antibody is administered once on the first day of each cycle and anlotinib is administered once daily on days 1-14 of each cycle.

In some embodiments of the present application, for the use or methods for treatment, the anti-PD-L1 antibody may be administered to the subject at a dose selected from the group consisting of: 0.01 to 40 mg/kg, 0.1 to 30 mg/kg, 0.1 to 20 mg/kg, 0.1 to 15 mg/kg, 0.1 to 10 mg/kg, 1 to 15 mg/kg, 1 to 20 mg/kg, 1 to 3 mg/kg, 3 to 10 mg/kg, 3 to 15 mg/kg, 3 to 20 mg/kg, 3 to 30 mg/kg, 10 to 20 mg/kg and 15 to 20 mg/kg; or administered to the subject at a dose of 60 mg to 2400 mg, 90 mg to about 1800 mg, 120 mg to 1500 mg, 300 mg to 900 mg, 600 mg to 900 mg, 300 mg to 1200 mg, 600 mg to 1200 mg, or 900 mg to 1200 mg.

In some embodiments for the use or methods for treatment, a treatment cycle takes 21 days; 1200 mg of the anti-PD-L1 antibody is administered on the first day of each cycle and 6 mg, 8 mg, 10 mg and/or 12 mg of anlotinib is administered daily on days 1-14 of each cycle.

In some embodiments of the present application, in a three-week treatment cycle, the anti-PD-L1 antibody and anlotinib are administered to the subject in a weight ratio of (0.35-29):1, preferably (3.5-29):1, more preferably (3.5-14.5):1, and most preferably (7-14.5):1, wherein the anti-PD-L1 antibody and anlotinib are administered in a single dose and multiple doses, respectively.

Pharmaceutical Composition of Anti-PD-L1 Antibody

In some embodiments of the present application, a single dose of the pharmaceutical composition of the anti-PD-L1 antibody comprises 300 mg or 600 mg of the anti-PD-L1 antibody.

In some embodiments of the present application, the pharmaceutical composition of the anti-PD-L1 antibody has a total dose of 600-2400 mg. In some embodiments, the total dose of the pharmaceutical composition of the anti-PD-L1 antibody is selected from the group consisting of 600 mg, 900 mg, 1200 mg, 1500 mg, 1800 mg, 2100 mg, 2400 mg and a range formed by any of the aforementioned values. In some embodiments, the total dose of the pharmaceutical composition of the anti-PD-L1 antibody is preferably 600-2100 mg or 900-1500 mg.

In some embodiments of the present application, the pharmaceutical composition of the anti-PD-L1 antibody comprises one or more of a buffer, an isotonicity adjusting agent, a stabilizer and/or a surfactant. In particular, the pharmaceutical composition of the anti-PD-L1 antibody comprises 1-150 mg/mL anti-PD-L1 antibody (e.g., mAb), 3-50 mM buffer, 2-150 mg/mL isotonicity adjusting agent/stabilizer, and 0.01-0.8 mg/mL surfactant, with a pH of about 4.5-6.8.

In some embodiments of the present application, for the pharmaceutical composition of the anti-PD-L1 antibody, the concentration of the anti-PD-L1 mAb is about 5-150 mg/mL, preferably about 10-60 mg/mL, and more preferably about 10-30 mg/mL (w/v). In some specific embodiments, the concentration of the anti-PD-L1 mAb is about 10 mg/mL, about 20 mg/mL, about 30 mg/mL, about 40 mg/mL, about 50 mg/mL, about 60 mg/mL, about 70 mg/mL, about 80 mg/mL, about 90 mg/mL, about 100 mg/mL, about 110 mg/mL, or about 120 mg/mL; preferably about 10 mg/mL, about 20 mg/mL, about 30 mg/mL, about 40 mg/mL, about 50 mg/mL, or about 60 mg/mL; more preferably about 10 mg/mL, about 20 mg/mL, or about 30 mg/mL (w/v). In some embodiments, the concentration of the anti-PD-L1 mAb is about 10 mg/mL (w/v). In other embodiments, the concentration of the anti-PD-L1 mAb is about 30 mg/mL (w/v). In other embodiments, the concentration of the anti-PD-L1 mAb is about 60 mg/mL (w/v).

In some embodiments of the present application, the buffer is a histidine salt buffer. The concentration of the histidine salt buffer is about 5-30 mM, preferably about 10-25 mM, more preferably about 10-20 mM, and most preferably about 10-15 mM. In some specific embodiments, the concentration of the histidine salt buffer is about 5 mM, about 10 mM, about 15 mM, about 20 mM, about 25 mM, or about 30 mM. In some embodiments, the concentration of the histidine salt buffer is about 10 mM. In other embodiments, the concentration of the histidine salt buffer is about 15 mM. In other embodiments, the concentration of the histidine salt buffer is about 20 mM. The histidine salt buffer comprises histidine and hydrochloric acid.

In some embodiments of the present application, the isotonicity adjusting agent/stabilizer is sucrose at about 20-150 mg/mL, preferably sucrose at about 40-100 mg/mL, and more preferably sucrose at about 60-80 mg/mL (w/v). In some specific embodiments, the concentration of sucrose is about 40 mg/mL, 50 mg/mL, 60 mg/mL, 70 mg/mL, 80 mg/mL, 90 mg/mL, or 100 mg/mL. In some specific embodiments, the concentration of sucrose is about 60 mg/mL. In some specific embodiments, the concentration of sucrose is about 70 mg/mL. In some specific embodiments, the concentration of sucrose is about 80 mg/mL. In some specific embodiments, the concentration of sucrose is about 90 mg/mL.

In some embodiments of the present application, the surfactant is selected from the group consisting of polysorbate 80, polysorbate 20 and poloxamer 188; preferably polysorbate 80 and polysorbate 20; and more preferably polysorbate 80. In some embodiments, the concentration of the surfactant is about 0.05-0.6 mg/mL, preferably about 0.1-0.4 mg/mL, and more preferably about 0.2-0.3 mg/mL (w/v).

In some embodiments of the present application, the surfactant is polysorbate 80 or polysorbate 20 at about 0.01-0.8 mg/mL (w/v). In some specific embodiments, the surfactant is polysorbate 80 at about 0.05-0.6 mg/mL, preferably polysorbate 80 at about 0.1-0.4 mg/mL, more preferably polysorbate 80 at about 0.2-0.3 mg/mL, and most preferably polysorbate 80 at about 0.2 mg/mL. In some embodiments, the amount of polysorbate 80 in the pharmaceutical composition is about 0.1 mg/mL, 0.2 mg/mL, 0.3 mg/mL, 0.4 mg/mL, 0.5 mg/mL, or 0.6 mg/mL; preferably, the amount of polysorbate 80 in the pharmaceutical composition is about 0.2 mg/mL, 0.3 mg/mL, 0.4 mg/mL, or 0.5 mg/mL; more preferably, the amount of polysorbate 80 in the pharmaceutical composition is about 0.2 mg/mL, 0.3 mg/mL, or 0.4 mg/mL; most preferably, the amount of polysorbate 80 in the pharmaceutical composition is about 0.2 mg/mL. In some embodiments, the amount of polysorbate 80 in the pharmaceutical composition is about 0.1 mg/mL. In other embodiments, the amount of polysorbate 80 in the pharmaceutical composition is about 0.2 mg/mL. In some embodiments, the amount of polysorbate 80 in the pharmaceutical composition is about 0.3 mg/mL. In other embodiments, the amount of polysorbate 80 in the pharmaceutical composition is about 0.4 mg/mL. In some embodiments, the amount of polysorbate 80 in the pharmaceutical composition is about 0.5 mg/mL.

In some embodiments of the present application, the pH of the aqueous solution of the pharmaceutical composition is 4.0-6.8, preferably 4.5-6.5, more preferably 5.5-6.0, and most preferably 5.5. In some embodiments, the pH of the aqueous solution of the pharmaceutical composition is about 4.5, about 4.8, about 5.0, about 5.2, about 5.4, about 5.5, about 5.6, about 5.8, or about 6.0; preferably about 5.0, about 5.2, about 5.4, about 5.5, or about 5.6; more preferably about 5.5. In some embodiments, the pH of the aqueous solution of the pharmaceutical composition is about 5.0. In some embodiments, the pH of the aqueous solution of the pharmaceutical composition is about 5.2. In some embodiments, the pH of the aqueous solution of the pharmaceutical composition is about 5.4. In some embodiments, the pH of the aqueous solution of the pharmaceutical composition is about 5.5. In some embodiments, the pH of the aqueous solution of the pharmaceutical composition is about 5.6. In some embodiments, the pH of the aqueous solution of the pharmaceutical composition is about 5.8. In some embodiments, the pH of the aqueous solution of the pharmaceutical composition is about 6.0.

In some specific embodiments of the present application, the pharmaceutical composition comprises: (a) an anti-PD-L1 antibody at about 20 mg/mL (w/v), (b) sucrose at about 70 mg/mL (w/v), (c) polysorbate 80 at about 0.1 mg/mL (w/v), (d) histidine at about 20 mM, and (e) optionally a suitable amount of hydrochloric acid for adjusting the pH of the composition to about 5.0. In one specific embodiment of the present application, the pharmaceutical composition comprises: (a) an anti-PD-L1 mAb at about 20 mg/mL (w/v), (b) sucrose at about 70 mg/mL (w/v), (c) polysorbate 80 at about 0.1 mg/mL (w/v), (d) histidine at about 20 mM, and (e) optionally a suitable amount of hydrochloric acid for adjusting the pH of the composition to about 5.0.

In another specific embodiment of the present application, the pharmaceutical composition comprises: (a) an anti-PD-L1 antibody at about 10 mg/mL (w/v), (b) sucrose at about 80 mg/mL (w/v), (c) polysorbate 80 at about 0.2 mg/mL (w/v), (d) histidine at about 10 mM, and (e) optionally a suitable amount of hydrochloric acid for adjusting the pH of the composition to about 5.5.

In another specific embodiment of the present application, the pharmaceutical composition comprises: (a) an anti-PD-L1 antibody at about 50 mg/mL (w/v), (b) sucrose at about 80 mg/mL (w/v), (c) polysorbate 80 at about 0.3 mg/mL (w/v), (d) histidine at about 10 mM, and (e) optionally a suitable amount of hydrochloric acid for adjusting the pH of the composition to about 5.5.

In another specific embodiment of the present application, the pharmaceutical composition comprises: (a) an anti-PD-L1 antibody at about 100 mg/mL (w/v), (b) sucrose at about 80 mg/mL (w/v), (c) polysorbate 80 at about 0.5 mg/mL (w/v), (d) histidine at about 10 mM, and (e) optionally a suitable amount of hydrochloric acid for adjusting the pH of the composition to about 5.5.

In another specific embodiment of the present application, the pharmaceutical composition comprises: (a) an anti-PD-L1 antibody at about 30 mg/mL (w/v), (b) sucrose at about 80 mg/mL (w/v), (c) polysorbate 80 at about 0.2 mg/mL (w/v), (d) histidine at about 10 mM, and (e) optionally a suitable amount of hydrochloric acid for adjusting the pH of the composition to about 5.5.

In another specific embodiment of the present application, the pharmaceutical composition comprises: (a) an anti-PD-L1 antibody at about 60 mg/mL (w/v), (b) sucrose at about 80 mg/mL (w/v), (c) polysorbate 80 at about 0.2 mg/mL (w/v), (d) histidine at about 10 mM, and (e) optionally a suitable amount of hydrochloric acid for adjusting the pH of the composition to about 5.5.

In another specific embodiment of the present application, the pharmaceutical composition comprises: (a) an anti-PD-L1 antibody at about 10 mg/mL (w/v), (b) sucrose at about 70 mg/mL (w/v), (c) polysorbate 80 at about 0.4 mg/mL (w/v), (d) histidine at about 20 mM, and (e) optionally a suitable amount of acetic acid for adjusting the pH of the composition to about 6.5.

In another specific embodiment of the present application, the pharmaceutical composition comprises: (a) an anti-PD-L1 mAb at about 10 mg/mL (w/v), (b) sucrose at about 80 mg/mL (w/v), (c) polysorbate 80 at about 0.2 mg/mL (w/v), (d) histidine at about 20 mM, and (e) optionally a suitable amount of hydrochloric acid for adjusting the pH of the composition to about 5.5.

In another specific embodiment of the present application, the pharmaceutical composition is a water-soluble injection, including but not limited to a water-soluble formulation without lyophilization or a water-soluble formulation reconstituted from a lyophilized powder. In other embodiments, the pharmaceutical composition is a lyophilized formulation. The lyophilized formulation refers to a formulation prepared by subjecting an aqueous solution to a lyophilization process in which a substance is first frozen, and then the amount of a solvent is reduced by sublimation (primary drying process) and then by desorption (secondary drying process) until the amount of the solvent is reduced to a value that no longer supports a biological activity or a chemical reaction. The lyophilized formulations of the present application can also be dried by other methods known in the art, such as spray drying and bubble drying.

Pharmaceutical Composition of Anlotinib

In some embodiments of the present application, the single dose of the pharmaceutical composition of anlotinib comprises 6 mg, 8 mg, 10 mg or 12 mg of anlotinib.

In some embodiments of the present application, according to a cycle of 2-week treatment plus 1-week interruption, the total dose of the pharmaceutical composition of anlotinib administered per treatment cycle comprises 84-168 mg. In some embodiments, the total dose of the pharmaceutical composition of anlotinib comprises an amount selected from the group consisting of 84 mg, 112 mg, 140 mg, 168 mg and a range formed by any of the aforementioned values. In some embodiments, the total dose of the pharmaceutical composition of anlotinib preferably comprises 112-168 mg.

Anti-PD-L1 Antibody

In some embodiments of the present application, the anti-PD-L1 antibody is the antibody disclosed in WO2016022630 or CN107001463A.

In some embodiments of the present application, the anti-PD-L1 antibody comprises an amino acid sequence as follows: a heavy chain CDR1 region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 1 or SEQ ID NO: 4; a heavy chain CDR2 region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 2 or SEQ ID NO: 5; a heavy chain CDR3 region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 3 or SEQ ID NO: 6; a light chain CDR1 region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 7 or SEQ ID NO: 10; a light chain CDR2 region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 8 or SEQ ID NO: 11; and a light chain CDR3 region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 9 or SEQ ID NO: 12.

In some embodiments of the present application, the anti-PD-L1 antibody comprises an amino acid sequence as follows: a heavy chain CDR1 region selected from the group consisting of SEQ ID NO: 1 and SEQ ID NO: 4; a heavy chain CDR2 region selected from the group consisting of SEQ ID NO: 2 and SEQ ID NO: 5; a heavy chain CDR3 region selected from the group consisting of SEQ ID NO: 3 and SEQ ID NO: 6; a light chain CDR1 region selected from the group consisting of SEQ ID NO: 7 and SEQ ID NO: 10; a light chain CDR2 region selected from the group consisting of SEQ ID NO: 8 and SEQ ID NO: 11; and a light chain CDR3 region selected from the group consisting of SEQ ID NO: 9 and SEQ ID NO: 12.

In some embodiments of the present application, an isolated anti-PD-L1 antibody described herein comprises: a heavy chain CDR1 region having an amino acid sequence set forth in SEQ ID NO: 1; a heavy chain CDR2 region having an amino acid sequence set forth in SEQ ID NO: 2; a heavy chain CDR3 region having an amino acid sequence set forth in SEQ ID NO: 3; a light chain CDR1 region having an amino acid sequence set forth in SEQ ID NO: 7; a light chain CDR2 region having an amino acid sequence set forth in SEQ ID NO: 8; and a light chain CDR3 region having an amino acid sequence set forth in SEQ ID NO: 9.

Each of the CDR regions described herein and the variants thereof described above are capable of specifically recognizing and binding to PD-L1, thereby effectively blocking the signaling between PD-L1 and PD-1.

In some embodiments of the present application, the anti-PD-L1 antibody comprises an amino acid sequence as follows: a heavy chain variable region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 13 or SEQ ID NO: 14; and a light chain variable region having at least 80% (e.g., 81%, 82%, 83%, 84%, 85%, 86%, 87%, 88%, 89%, 90%, 91%, 92%, 93%, 94%, 95%, 96%, 97%, 98%, 99% or 100%) homology to an amino acid sequence set forth in SEQ ID NO: 15 or SEQ ID NO: 16.

In some embodiments of the present application, the anti-PD-L1 antibody comprises an amino acid sequence as follows: a heavy chain variable region set forth in SEQ ID NO: 13, and a light chain variable region set forth in SEQ ID NO: 15.

In some embodiments of the present application, the anti-PD-L1 antibody comprises an amino acid sequence as follows: a heavy chain variable region set forth in SEQ ID NO: 14, and a light chain variable region set forth in SEQ ID NO: 16.

In some embodiments of the present application, the anti-PD-L1 antibody comprises an amino acid sequence as follows: a heavy chain amino acid sequence set forth in SEQ ID NO: 17, and a light chain amino acid sequence set forth in SEQ ID NO: 18.

In some embodiments of the present application, the anti-PD-L1 antibody comprises an amino acid sequence as follows: a heavy chain variable region set forth in SEQ ID NO: 19, and a light chain variable region set forth in SEQ ID NO: 20.

In some embodiments of the present application, the anti-PD-L1 antibody comprises an amino acid sequence as follows: a heavy chain amino acid sequence set forth in SEQ ID NO: 21, and a light chain amino acid sequence set forth in SEQ ID NO: 18.

In one specific embodiment, the humanized anti-PD-L1 mAb disclosed herein comprises one or more conservatively substituted variants selected from the group consisting of: SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, SEQ ID NO: 20 and SEQ ID NO: 21. The humanized anti-PD-L1 mAb comprising the conservatively substituted variants retains the ability to specifically recognize and bind to PD-L1.

In some embodiments of the present application, the anti-PD-L1 antibody may be an IgG1 or IgG4 antibody.

In some embodiments of the present application, the anti-PD-L1 antibody is an IgG1 antibody. In some embodiments, the anti-PD-L1 antibody is a glycosylated IgG1 antibody.

In some embodiments of the present application, the anti-PD-L1 antibody comprises heavy chain complementarity determining regions (CDRs) selected from the group consisting of heavy chain CDRs derived from antibodies 13C5 and 5G11, and light chain CDRs selected from the group consisting of light chain CDRs derived from antibodies 13C5 and 5G11. In one embodiment, the anti-PD-L1 antibody disclosed herein comprises: a heavy chain variable region selected from the group consisting of heavy chain variable regions of chimeric antibodies ch5G11-hIgG1, ch5G11-hIgG4, ch13C5-hIgG1 and ch13C5-hIgG4; and a light chain variable region selected from the group consisting of light chain variable regions of chimeric antibodies ch5G11-hIgG1, ch5G11-hIgG4, ch13C5-hIgG1 and ch13C5-hIgG4. In one embodiment, the anti-PD-L1 antibody disclosed herein comprises: a heavy chain variable region selected from the group consisting of heavy chain variable regions of humanized antibodies hu13C5-hIgG1, hu13C5-hIgG4, hu5G11-hIgG1 and hu5G11-hIgG4; and a light chain variable region selected from the group consisting of light chain variable regions of humanized antibodies hu13C5-hIgG1, hu13C5-hIgG4, hu5G11-hIgG1 and hu5G11-hIgG4. Reference may be made to the description of Patent No. WO2016022630 or CN107001463A: 13C5, ch13C5-hIgG1, ch13C5-hIgG4, hu13C5-hIgG1 or hu13C5-hIgG4 has an HCDR1 sequence of SYGMS (SEQ ID NO: 4), an HCDR2 sequence of SISSGGSTYYPDSVKG (SEQ ID NO: 5), an HCDR3 sequence of GYDSGFAY (SEQ ID NO: 6), an LCDR1 sequence of ASQSVSTSSSSFMH (SEQ ID NO: 10), an LCDR2 sequence of YASNLES (SEQ ID NO: 11), and an LCDR3 sequence of QHSWEIPYT (SEQ ID NO: 12); 5G11, ch5G11-hIgG1, ch5G11-hIgG4, hu5G11-hIgG1 or hu5G11-hIgG4 has an HCDR1 sequence of TYGVH (SEQ ID NO: 1), an HCDR2 sequence of VIWRGVTTDYNAAFMS (SEQ ID NO: 2), an HCDR3 sequence of LGFYAMDY (SEQ ID NO: 3), an LCDR1 sequence of KASQSVSNDVA (SEQ ID NO: 7), an LCDR2 sequence of YAANRYT (SEQ ID NO: 8), and an LCDR3 sequence of QQDYTSPYT (SEQ ID NO: 9).

In some embodiments of the present application, the anti-PD-L1 antibody in the pharmaceutical combination may be selected from one or more. As used herein, the term "more" refers to more than one, for example, two, three, four, five or more. For example, in some embodiments of the present application, the anti-PD-L1 antibody is selected from the group consisting of an antibody comprising a heavy chain variable region set forth in SEQ ID NO: 13 and a light chain variable region set forth in SEQ ID NO: 15, or selected from the group consisting of an antibody comprising a heavy chain variable region set forth in SEQ ID NO: 14 and a light chain variable region set forth in SEQ ID NO: 16, or selected from the group consisting of a combination thereof. As another example, the anti-PD-L1 antibody is selected from the group consisting of an antibody comprising a heavy chain amino acid sequence set forth in SEQ ID NO: 17 and a light chain amino acid sequence set forth in SEQ ID NO: 18, or selected from the group consisting of an antibody comprising a heavy chain amino acid sequence set forth in SEQ ID NO: 19 and a light chain amino acid sequence set forth in SEQ ID NO: 20, or selected from the group consisting of an antibody comprising a heavy chain amino acid sequence set forth in SEQ ID NO: 21 and a light chain amino acid sequence set forth in SEQ ID NO: 18, or selected from the group consisting of combinations of any of the foregoing.

Anlotinib

As used herein, the chemical name of the free base of anlotinib is 1-[[[4-(4-fluoro-2-methyl-1H-indol-5-yl)oxy-6-methoxyquinolin-7-yl]oxy]methyl]cyclopropylamine, which has the following structural formula:

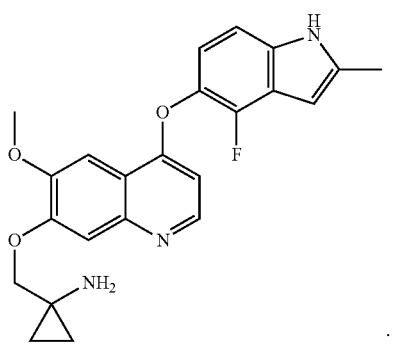 [SMILES: COc1cc2c(Oc3ccc4[nH]c(C)cc4c3F)ccnc2cc1OCC1(N)CC1]

As used herein, anlotinib includes non-salt forms thereof (for example, free bases) and further includes pharmaceutically acceptable salts thereof. All the non-salt forms or salts fall within the scope of protection of the present application. For example, the pharmaceutically acceptable salt of anlotinib can be hydrochloride or dihydrochloride. Unless otherwise stated, the dose of anlotinib or a salt thereof involved in present application is calculated based on the molecular weight of free base of anlotinib.

Small Cell Lung Cancer

In some embodiments, the small cell lung cancer comprises limited-stage and extensive-stage small cell lung cancer. In some embodiments, the small cell lung cancer is recurrent and/or metastatic small cell lung cancer. In some embodiments, the small cell lung cancer comprises sensitive relapsed and/or refractory relapsed small cell lung cancer. In some embodiments of the present application, the small cell lung cancer is one that has been treated with surgery, chemotherapy, and/or radiotherapy. In some embodiments of the present application, the small cell lung cancer is one that has failed prior treatment with chemotherapeutic drugs. In some embodiments, the chemotherapy is selected from chemotherapies comprising platinum-based drugs. In some embodiments, the platinum-based drugs include, but are not limited to, cisplatin and carboplatin. In some embodiments, the small cell lung cancer is brain metastatic small cell lung cancer.

The chemotherapeutic drug includes, but is not limited to, one or more of anti-tumor drugs such as platinums, podophyllums, alkylating agents, camptothecins, taxanes, antimetabolites and antibiotics; examples that may be listed include, but are not limited to, one or more of platinums (e.g., cisplatin, carboplatin, nedaplatin, miriplatin or oxaliplatin), etoposide, irinotecan, topotecan, paclitaxel, docetaxel, temozolomide, vinorelbine, gemcitabine, cyclophosphamide, doxorubicin, vincristine, bendamustine, epirubicin, methotrexate, and amrubicin.

Administration

The content below is not intended to limit the manner of administration of the pharmaceutical combination disclosed herein.

The components in the pharmaceutical composition disclosed herein can be administered independently, or some or all of the components are co-administered in various proper routes including, but not limited to, oral administration or parenteral administration (by intravenous, intramuscular, local or subcutaneous routes). In some embodiments, the components in the pharmaceutical combination disclosed herein can be administered independently, or some or all of the components are co-administered by means of oral administration or injection, for example, intravenous injection or intraperitoneal injection.

The components in the pharmaceutical composition disclosed herein can be formulated independently in suitable dosage forms, or some or all of the components are co-formulated in a suitable dosage form including, but not limited to, tablet, lozenge, pill, capsule (for example, hard capsule, soft capsule, enteric capsule and microcapsule), elixir, granule, syrup, injection (intramuscular, intravenous and intraperitoneal), granule, emulsion, suspension, solution, dispersant and dosage forms of sustained-released preparations for oral or non-oral administration.

The components in the pharmaceutical combination disclosed herein can be formulated independently, or some or all of the components are co-formulated with a pharmaceutically acceptable carrier and/or excipient.

The pharmaceutical combination disclosed herein may further comprise an additional therapeutic agent. In one embodiment, the additional therapeutic agent can be a known therapeutic agent for small cell cancer in the art.

Technical Effects

Generally, use of the combined pharmaceutical composition disclosed herein will provide:

(1) better efficacy in controlling tumor growth or even eliminating tumors as compared with either drug of the combination administered alone;

(2) fewer doses as compared with either drug of the combination administered alone;

(3) good tolerability in patients, and fewer adverse effects and/or complications as compared with either drug administered alone;

(4) a higher disease control rate in patients treated;

(5) longer survivals (e.g., median survival, progression-free survival, or overall survival) in patients treated;

(6) longer survivals (e.g., median survival, progression-free survival, or overall survival) in patients treated as compared with standard chemotherapies;

(7) a longer duration of response (DOR); and/or (8) better activity in treating small cell lung cancer and better anti-tumor synergistic effect, as compared with either drug of the combination administered alone.

DEFINITIONS AND DESCRIPTION

Unless otherwise stated, the following terms used in the present application shall have the following meanings. A specific term, unless otherwise specifically defined, should not be considered uncertain or unclear, but construed according to its common meaning in the art. When referring to a trade name, it is intended to refer to its corresponding commercial product or its active ingredient.

As used herein, the term "combined pharmaceutical composition" refers to a combination of two or more active ingredients (administered as the respective active ingredients themselves, or as their respective pharmaceutically acceptable salts or esters, derivatives, prodrugs, or compositions) that are administered simultaneously or sequentially. The terms "combined pharmaceutical composition", "pharmaceutical composition" and "pharmaceutical combination" are used interchangeably herein.

As used herein, the term "antibody" refers to a binding protein having at least one antigen-binding domain. The antibody and the fragment thereof disclosed herein can be an intact antibody or any fragment thereof. Thus, the antibody and the fragment thereof disclosed herein include a monoclonal antibody or a fragment thereof and an antibody variant or a fragment thereof, as well as an immunoconjugate. Examples of the antibody fragment include a Fab fragment, a Fab' fragment, an F(ab')$_2$ fragment, an Fv fragment, an isolated CDR region, a single chain Fv molecule (scFv), an Fd fragment and other antibody fragments known in the art. The antibody and the fragment thereof may also include a recombinant polypeptide, a fusion protein, and a bispecific antibody. The anti-PD-L1 antibody and the fragment thereof disclosed herein can be of IgG1, IgG2, IgG3, or IgG4 isotype. The term "isotype" refers to the class of antibodies encoded by the heavy chain constant region gene. In one embodiment, the anti-PD-L1 antibody and the fragment thereof disclosed herein are of the IgG1 or IgG4 isotype.

The anti-PD-L1 antibody and the fragment thereof disclosed herein can be derived from any species including, but not limited to, mouse, rat, rabbit, primate, llama, and human. The anti-PD-L1 antibody and the fragment thereof can be a chimeric antibody, a humanized antibody or an intact human antibody. In one embodiment, the anti-PD-L1 antibody is an antibody produced by a hybridoma cell line derived from a mouse. Thus, in one embodiment, the anti-PD-L1 antibody is a murine antibody. In another embodiment, the anti-PD-L1 antibody is a chimeric antibody. In another embodiment, the chimeric antibody is a mouse-human chimeric antibody. In another embodiment, the antibody is a humanized antibody. In another embodiment, the antibody is derived from a murine antibody and is humanized.

The term "humanized antibody" refers to an antibody comprising complementarity determining regions (CDRs) derived from a non-human antibody, and framework and constant regions derived from a human antibody. For example, an anti-PD-L1 antibody disclosed herein may comprise CDRs derived from one or more murine antibodies as well as human framework and constant regions. Thus, in one embodiment, the humanized antibody disclosed herein binds to the same epitope on PD-L1 as the murine antibody from which the CDRs of the humanized antibody are derived. Exemplary humanized antibodies are disclosed herein. Additional anti-PD-L1 antibodies or variants thereof comprising the heavy and light chain CDRs disclosed herein can be generated using any human framework sequences, and are also included in the present application. In one embodiment, framework sequences suitable for use in the present application include those similar in structure to the framework sequences disclosed herein. Additional modifications may be made in the framework regions to improve the properties of the antibodies disclosed herein. Such additional framework modifications may include: chemical modifications, point mutations for reducing immunogenicity or removing T cell epitopes, or modifications reverting the mutations to residues in original germline sequences. In some embodiments, such modifications include those corresponding to the mutations exemplified herein, including reversions to germline sequences. For example, in one embodiment, one or more amino acids in the human VH and/or VL framework regions of the humanized antibodies disclosed herein are reverted to the corresponding amino acids in the parent murine antibodies. For example, for the VH and VL of humanized 5G11 and humanized 13C5 antibodies, several sites of framework amino acids of the template human antibodies described above may be reverted to the corresponding amino acid sequences in the mouse 5G11 and 13C5 antibodies. In one embodiment, the amino acids at positions 53, 60 and/or 67 of the light chain variable region are reverted to the corresponding amino acids found at the positions in mouse 5G11 or 13C5 light chain variable region. In another embodiment, the amino acids at positions 24, 28, 30, 49, 73, 83 and/or 94 of the heavy chain variable region are reverted to the corresponding amino acids found at the positions in mouse 5G11 or 13C5 heavy chain variable region. In one embodiment, the humanized 5G11 antibody comprises: a light chain variable region, wherein the amino acid at position 60 is mutated from Ser (S) to Asp (D) and the amino acid at position 67 is mutated from Ser (S) to Tyr (Y); and a heavy chain variable region, wherein the amino acid at position 24 is mutated from Phe (F) to Val (V), the amino acid at position 49 is mutated from Ala (A) to Gly (G), the amino acid at position 73 is mutated from Thr (T) to Asn (N), and the amino acid at position 83 is mutated from Thr (T) to Asn (N). In one embodiment, the humanized 13C5 antibody comprises: a light chain variable region, wherein the amino acid at position 53 is mutated from Tyr (Y) to Lys (K); and a heavy chain variable region, wherein the amino acid at position 28 is mutated from Thr (T) to Ile (I), the amino acid at position 30 is mutated from Ser (S) to Arg (R), the amino acid at position 49 is mutated from Ser (S) to Ala (A), and the amino acid at position 94 is mutated from Tyr (Y) to Asp (D). Additional or alternative reverse mutations can be made in the framework regions of the humanized antibodies disclosed herein to improve the properties of the antibodies. The present application also includes humanized antibodies that bind to PD-L1 and comprise framework modifications corresponding to the exemplary modifications disclosed herein relative to any suitable framework sequence and other framework modifications that otherwise improve antibody properties.

The present application provides an isolated antibody or a fragment thereof that binds to PD-L1, wherein the antibody can be produced by a hybridoma selected from the group consisting of the hybridomas designated herein as 13C5 and 5G11. Accordingly, the present application also includes hybridomas 13C5 and 5G11, and any hybridomas that produce the antibodies disclosed herein. The present application also provides isolated polynucleotides encoding the antibodies and the fragments thereof disclosed herein. The present application also includes expression vectors comprising the isolated polynucleotides, and host cells comprising the expression vectors.

The term "isolated antibody" refers to an antibody that is substantially free of other antibodies having different antigenic specificities (e.g., an isolated antibody that specifically binds to PD-1 is substantially free of antibodies that specifically bind to antigens apart from PD-1). However, an isolated antibody that specifically binds to PD-1 may have cross-reactivity with other antigens (such as PD-1 molecules from different species). Furthermore, the isolated antibody may be substantially free of other cellular materials and/or chemicals.

The term "monoclonal antibody" ("mAb") refers to a non-naturally occurring preparation of antibody molecules of an individual molecule component (i.e., antibody molecules whose base sequences are substantially identical and which exhibit a single binding specificity and affinity for a particular epitope). mAb is an example of the isolated antibody. mAbs can be produced by hybridoma techniques, recombinant techniques, transgenic techniques, or other techniques known to those skilled in the art.

The antibody or the antigen binding fragment thereof disclosed herein is specific for PD-L1. In one embodiment, the antibody or the fragment thereof is specific for PD-L1. In one embodiment, the antibody or the fragment thereof disclosed herein binds to human or primate PD-L1, but does not bind to PD-L1 from any other mammals. In another embodiment, the antibody or the fragment thereof does not bind to mouse PD-L1. The terms "human PD-L1", "hPD-L1", "huPD-L1" and the like, are used interchangeably herein and refer to human PD-L1 and variants or isotypes of human PD-L1. The terms "specific", "specificity" and "specifically" refer to that the antibody or the fragment thereof binds to PD-L1 with greater affinity than any other targets.

The terms "treat", "treating" and "treatment" usually refer to acquiring needed pharmacological effect and/or physiological effect. In terms of fully or partially preventing a disease or a symptom thereof, the effect can be preventive; and/or in terms of partially or fully stabilizing or curing the disease and/or a side effect of the disease, the effect can be therapeutic. As used herein, "treat", "treating" and "treatment" encompass any treatment to a disease in a patient, including (a) preventing a disease or a symptom that has not been confirmed in a susceptible patient; (b) inhibiting a symptom of a disease, i.e., blocking the progression of the disease; or (c) alleviating a symptom of a disease, i.e., causing remission of the disease or the symptom.

The term "effective amount" refers to an amount of the compound disclosed herein for (i) treating or preventing a specific disease, condition or disorder; (ii) alleviating, relieving or eliminating one or more symptoms of a specific disease, condition or disorder, or (iii) preventing or delaying onset of one or more symptoms of a specific disease, condition or disorder described herein. The amount of active substance (e.g., the antibody or compound disclosed herein) constituting a "therapeutically effective amount" may vary according to factors such as the disease state, age, sex, and weight of the individual, and the ability of a therapeutic agent or a combination of therapeutic agents to elicit a desired response in the individual. The effective amount may also be determined routinely by those skilled in the art in accordance with their knowledge and the present disclosure.

The terms "administer" and "administration" refer to physically introducing the composition comprising the therapeutic agent to an entity using any of a variety of methods and delivery systems known to those skilled in the art. Routes of administration of immune checkpoint inhibitors (e.g., an anti-PD-1 antibody or an anti-PD-L1 antibody) include intravenous, intramuscular, subcutaneous, intraperitoneal, spinal, or other parenteral routes of administration, for example, by injection or infusion. As used herein, the phrase "parenteral administration" refers to routes of administration apart from enteral and local administrations, typically by injection, including, but not limited to, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion and in vivo electroporation.

In some embodiments, the immune checkpoint inhibitor (e.g., an anti-PD-1 antibody or an anti-PD-L1 antibody) is administered by a non-parenteral route, and in some embodiments, by oral administration. Other non-parenteral routes include local, epidermal or mucosal routes of administration, for example, intranasal, vaginal, rectal, sublingual or local administration. Administration may also be performed, e.g., once, multiple times, and/or over one or more extended periods of time.

The term "dose" refers to a dose administered to a patient without considering the weight or the body surface area (BSA) of the patient. For example, a 60 kg human and a 100 kg human will receive the same dose of antibody (e.g., 240 mg of anti-PD-1 antibody).

The term "weight-based dose" as used herein refers to a dose administered to a patient calculated on the basis of the patient's body weight. For example, when a patient having a weight of 60 kg requires 3 mg/kg of anti-PD-1 antibody, one can extract an appropriate amount of anti-PD-1 antibody (i.e., 180 mg) at a time from a fixed-dose formulation of the anti-PD-1 antibody.

Anlotinib can be administered in various routes including, but not limited to, oral, parenteral, intraperitoneal, intravenous, intra-arterial, transdermal, sublingual, intramuscular, rectal, transbuccal, intranasal, inhalational, vaginal, intraocular, topical, subcutaneous, intralipid, intraarticular and intrathecal administrations. In some specific embodiments, the drug is administered orally. The amount of anlotinib administered can be determined according to the severity of the disease, the response of the disease, any treatment-related toxicity, and the age and health of a patient. For example, the daily dose of anlotinib can be 2 mg to 20 mg. In some embodiments, the daily dose of anlotinib or the pharmaceutically acceptable salt thereof can be 2 mg, 3 mg, 4 mg, 5 mg, 6 mg, 7 mg, 8 mg, 9 mg, 10 mg, 11 mg, 12 mg, 13 mg, 14 mg, 15 mg and 16 mg. Anlotinib can be administered once or multiple times daily. In some embodiments, anlotinib is administered once daily in the form of a solid oral preparation.

The regimen for anlotinib can be determined comprehensively depending on the activity and toxicity of the medicament, tolerance of the patient, etc. Preferably, anlotinib is administered at intervals. Administration at intervals comprises a treatment period and an interruption period. In the treatment period, anlotinib can be administered once or multiple times daily. For example, the ratio of the treatment period to the interruption period in days is 2:0.5-2:5, preferably 2:0.5-2:3, more preferably 2:0.5-2:2, and most preferably 2:0.5-2:1. In some embodiments, the treatment is administered for 2 weeks and interrupted for 2 weeks. In some embodiments, the treatment is administered for 2 weeks and interrupted for 1 week. In some embodiments, the treatment is administered for 5 days and interrupted for 2 days. For example, anlotinib can be administered once daily at a dose of 6 mg, 8 mg, 10 mg or 12 mg for 2 weeks, and interrupted for 1 week.

The term "pharmaceutically acceptable" is used herein for those compounds, materials, compositions, and/or dosage forms which are, within the scope of sound medical judgment, suitable for use in contact with the tissues of human beings and animals without excessive toxicity, irritation, allergic response, or other problems or complications, and commensurate with a reasonable benefit/risk ratio.

The term "pharmaceutically acceptable salt" includes salts formed by basic radicals and free acids and salts formed by acidic radicals and free bases, for example, hydrochloride, hydrobromide, nitrate, sulfate, phosphate, formate, acetate, trifluoroacetate, fumarate, oxalate, maleate, citrate, succinate, mesylate, benzenesulfonate and p-methylbenzenesulfonate, preferably hydrochloride, hydrobromide, sulfate, formate, acetate, trifluoroacetate, fumarate, maleate, mesylate, p-methylbenzenesulfonate, sodium salt, potassium salt, ammonium salt, and amino acid salt. In the present application, when forming a pharmaceutically acceptable salt, the free acid and the basic radical are in a molar ratio of about 1:0.5 to 1:5, preferably 1:0.5, 1:1, 1:2, 1:3, 1:4, 1:5, 1:6, 1:7 or 1:8.

The terms "subject" and "patient" are used interchangeably herein. In some embodiments, the term "subject" or "patient" refers to a mammal. In some embodiments, the subject or patient is a mouse. In some embodiments, the subject or patient is a human.

The term "about" shall be understood to include a range of three standard deviations from the mean value or a standard tolerance range in a specific field. In some embodiments, the term "about" shall be understood as a variation not exceeding 0.5. The term "about" modifies all listed values thereafter. For example, "about 1, 2 and 3" means "about 1", "about 2", and "about 3".

As used herein, "combined use" or "use in combination" means that two or more active substances may be administered to a subject simultaneously or sequentially in any order as a single formulation.

The term "single dose" refers to the smallest unit of packaging containing a certain quantity of pharmaceutical product, for example, in a box of seven capsules, each capsule is a single dose; or a vial of injection can be a single dose. As used herein, the terms "single dose" and "unit dose" have the same meaning and are used interchangeably.

The term "multiple dose" consists of multiple single doses.

The term "pharmaceutical composition" refers to a mixture consisting of one or more of the active ingredients or pharmaceutical combinations thereof disclosed herein and a pharmaceutically acceptable excipient. The pharmaceutical composition is intended to facilitate the administration of the compound or the pharmaceutical combination thereof to a subject.

As used herein, unless otherwise stated, the terms "comprise", "comprises" and "comprising" or equivalents thereof are open-ended statements and mean that elements, components and steps that are not specified may be included in addition to those listed.

All patents, patent applications and other identified publications are expressly incorporated herein by reference for the purpose of description and disclosure. These publications are provided solely because they were disclosed prior to the filing date of the present application. All statements as to the dates of these documents or description as to the contents of these documents are based on the information available to the applicant and do not constitute any admission as to the correctness of the dates of these documents or the content of these documents. Moreover, in any country or region, any reference to these publications herein is not to be construed as an admission that the publications form part of the commonly recognized knowledge in the art.

DETAILED DESCRIPTION

For clarity, the present application is further described with the following examples, which are, however, not intended to limit the scope of the present application. All reagents used in the present application are commercially available and can be used without further purification. In the examples, the anti-PD-L1 antibody was prepared as described in WO2016022630, and after affinity chromatography, the antibody-containing eluate was obtained by conventional antibody purification methods.

Example 1. Clinical Trial of Small Cell Lung Cancer 1.1 Inclusion Criteria
1) Pathologically confirmed patients with advanced/metastatic solid tumors for which standard therapy has failed or no standard treatment exists; at least one measurable lesion is present;

2) Aged 18-70 years; ECOG physical condition: 0-1; an expected survival of more than 3 months;

3) Normal main organ functions meeting the following criteria:
 a) Blood Routine Examination: (no blood transfusion or no correction using hematopoietic stimulating drugs within the last 14 days): hemoglobin (Hb)≥90 g/L; absolute neutrophil count (ANC)≥1.5×10$^9$/L; platelet count (PLT)≥100×10$^9$/L;
 b) Biochemical Tests: alanine transaminase (ALT) and aspartate transaminase (AST)≤2.5×ULN (for patients with tumor liver metastasis, ≤5×ULN); total bilirubin (TBIL) in serum ≤1.5×ULN (for patients with Gilbert syndrome, ≤3×ULN); serum creatinine (Cr)≤1.5×ULN, or creatinine clearance rate ≥60 mL/min;
 c) Blood coagulation: activated partial thromboplastin time (APTT), international normalized ratio (INR), prothrombin time (PT)≤1.5×ULN;
 d) Doppler ultrasound evaluation: left ventricular ejection fraction (LVEF)≥50%.

4) Female subjects of childbearing age should agree to take contraceptive measures (such as intrauterine devices [IUD], contraceptives or condoms) during the study and for 6 months after the study; serum or urine pregnancy test results should be negative within 7 days before enrollment, and the subjects must not be breastfeeding; male subjects should agree to take contraceptive measures during the study and for 6 months after the study; and 5) Voluntary participation, written informed consent and good compliance.

1.2 Test Drug

Anti-PD-L1 antibody hu5G11-hIgG1 injection: 1200 mg of anti-PD-L1 antibody injection was diluted to 250 mL using normal saline; the diluted drug was administered in 60±5 min by infusion; the infusion system was flushed with normal saline according to the routine requirements of hospitals after the completion of infusion; the injection was administered once every 21 days, i.e., in 21-day treatment cycles.

Dosage: 100 mg/10 mL and 300 mg/10 mL.

Anlotinib hydrochloride capsule (active ingredient: anlotinib dihydrochloride): 5 minutes before or after the start of anti-PD-L1 antibody infusion, an anlotinib hydrochloride capsule was administered orally at fasting each time; the treatment was given for 2 weeks and interrupted for 1 week, i.e., in 21-day treatment cycles.

Dosage: 12 mg, 10 mg, 8 mg, and 6 mg.

1.3 Evaluation Criteria

Disease status was assessed by RECIST 1.1/irRECIST, and mainly by RECIST 1.1 criteria.

1.4 Endpoints

Progression-free survival (PFS);

Anti-tumor efficacy endpoints: objective response rate (ORR)=(complete response (CR)+partial response (PR)), disease control rate (DCR=CR+PR+stable disease (SD)), Progression-free survival (PFS), overall survival (OS), and the like.

1.5 Results

| No. | Pathological diagnosis | Tumor size (baseline) | Response evaluation and tumor size (C2) | Response evaluation and tumor size (C4) | Response evaluation and tumor size (C6) | Response evaluation and tumor size (C8) |
|---|---|---|---|---|---|---|
| C01004 | Small cell lung cancer | 29 mm | 21 mm SD | 5 mm PR | 5 mm PR | 5 mm PR |
| C01008 | Small cell lung cancer | 77 mm | 54 mm SD | 51 mm PR | — | — |

Note:
"—" indicates that no relevant test was performed

Medication profile: patients C01004 and C01008 were administered with a combination of 1200 mg of anti-PD-L1 antibody hu5G11-hIgG1 injection and 12 mg of anlotinib hydrochloride capsule (in examples of the present application, the amount of anlotinib hydrochloride capsule was based on the weight of the free base of anlotinib contained therein).

In the above examples, each treatment cycle took 21 days, and C2, C4, C6 and C8 indicate 2 cycles, 4 cycles, 6 cycles and 8 cycles, respectively. In the above examples, the tumor size (baseline) refers to the longest radiographic diameter of the target lesion of tumor before the study treatment.

What is claimed is:

1. A method for treating small cell lung cancer, comprising administering to a subject an effective amount of an anti-PD-L1 antibody and anlotinib, wherein the anti-PD-L1 antibody comprises an amino acid sequence as follows: a heavy chain CDR1 region selected from the group consisting of SEQ ID NO: 1; a heavy chain CDR2 region selected from the group consisting of SEQ ID NO: 2; a heavy chain CDR3 region selected from the group consisting of SEQ ID NO: 3; a light chain CDR1 region selected from the group consisting of SEQ ID NO: 7; a light chain CDR2 region selected from the group consisting of SEQ ID NO: 8; and a light chain CDR3 region selected from the group consisting of SEQ ID NO: 9.

2. The method according to claim 1, wherein the method comprises administering a combination of the anti-PD-L1 antibody and anlotinib.

3. The method according to claim 1, wherein the anti-PD-L1 antibody and anlotinib are each in the form of a pharmaceutical composition that can be administered simultaneously, sequentially or at intervals.

4. The method according to claim 1, wherein the anti-PD-L1 antibody is administered once every week, every 2 weeks, every 3 weeks, or every 4 weeks.

5. The method according to claim 4, wherein the anti-PD-L1 antibody is administered at a dose of 600-2400 mg each time.

6. The method according to claim 1, wherein anlotinib is administered at a dose of 6 mg, 8 mg, 10 mg, or 12 mg once daily with a regimen of continuous 2-week treatment plus 1-week interruption.

7. The method according to claim 3, wherein the method comprises administering a pharmaceutical composition containing 600-2400 mg of the anti-PD-L1 antibody and a pharmaceutical composition containing anlotinib in a single dose of 6 mg, 8 mg, 10 mg and/or 12 mg.

8. The method according to claim 1, wherein the anti-PD-L1 antibody and anlotinib are packaged either separately or together.

9. The method according to claim 1, wherein the anti-PD-L1 antibody comprises an amino acid sequence as follows: a heavy chain variable region having at least 80% homology to an amino acid sequence set forth in SEQ ID NO: 13; and a light chain variable region having at least 80% homology to an amino acid sequence set forth in SEQ ID NO: 15.

10. The method according to claim 1, wherein the anti-PD-L1 antibody comprises an amino acid sequence as follows: a heavy chain amino acid sequence set forth in SEQ ID NO: 17; and a light chain amino acid sequence set forth in SEQ ID NO: 18.

11. The method according to claim 1, wherein a treatment cycle takes 21 days; 1200 mg of the anti-PD-L1 antibody is administered on the first day of each treatment cycle, and 6 mg, 8 mg, 10 mg or 12 mg of anlotinib is administered daily on days 1-14 of each treatment cycle.

12. The method according to claim 1, wherein the small cell lung cancer comprises limited-stage and extensive-stage small cell lung cancer;
the small cell lung cancer is recurrent and/or metastatic small cell lung cancer; or
the small cell lung cancer is advanced/metastatic small cell lung cancer.

13. The method according to claim 9, wherein the anti-PD-L1 antibody comprises: a heavy chain variable region having an amino acid sequence set forth in SEQ ID NO: 13, and a light chain variable region having an amino acid sequence set forth in SEQ ID NO: 15.

* * * * *

SEQUENCE LISTING

```
<160> NUMBER OF SEQ ID NOS: 21

<210> SEQ ID NO 1
<211> LENGTH: 5
<212> TYPE: PRT
<213> ORGANISM: Mus sp.

<400> SEQUENCE: 1

Thr Tyr Gly Val His
1               5

<210> SEQ ID NO 2
<211> LENGTH: 16
<212> TYPE: PRT
<213> ORGANISM: Mus sp.

<400> SEQUENCE: 2

Val Ile Trp Arg Gly Val Thr Thr Asp Tyr Asn Ala Ala Phe Met Ser
1               5                   10                  15

<210> SEQ ID NO 3
<211> LENGTH: 8
<212> TYPE: PRT
<213> ORGANISM: Mus sp.

<400> SEQUENCE: 3

Leu Gly Phe Tyr Ala Met Asp Tyr
1               5

<210> SEQ ID NO 4
<211> LENGTH: 5
<212> TYPE: PRT
<213> ORGANISM: Mus sp.

<400> SEQUENCE: 4

Ser Tyr Gly Met Ser
1               5

<210> SEQ ID NO 5
```

```
<211> LENGTH: 16
<212> TYPE: PRT
<213> ORGANISM: Mus sp.

<400> SEQUENCE: 5

Ser Ile Ser Ser Gly Gly Ser Thr Tyr Tyr Pro Asp Ser Val Lys Gly
1               5                   10                  15

<210> SEQ ID NO 6
<211> LENGTH: 8
<212> TYPE: PRT
<213> ORGANISM: Mus sp.

<400> SEQUENCE: 6

Gly Tyr Asp Ser Gly Phe Ala Tyr
1               5

<210> SEQ ID NO 7
<211> LENGTH: 11
<212> TYPE: PRT
<213> ORGANISM: Mus sp.

<400> SEQUENCE: 7

Lys Ala Ser Gln Ser Val Ser Asn Asp Val Ala
1               5                   10

<210> SEQ ID NO 8
<211> LENGTH: 7
<212> TYPE: PRT
<213> ORGANISM: Mus sp.

<400> SEQUENCE: 8

Tyr Ala Ala Asn Arg Tyr Thr
1               5

<210> SEQ ID NO 9
<211> LENGTH: 9
<212> TYPE: PRT
<213> ORGANISM: Mus sp.

<400> SEQUENCE: 9

Gln Gln Asp Tyr Thr Ser Pro Tyr Thr
1               5

<210> SEQ ID NO 10
<211> LENGTH: 14
<212> TYPE: PRT
<213> ORGANISM: Mus sp.

<400> SEQUENCE: 10

Ala Ser Gln Ser Val Ser Thr Ser Ser Ser Phe Met His
1               5                   10

<210> SEQ ID NO 11
<211> LENGTH: 7
<212> TYPE: PRT
<213> ORGANISM: Mus sp.

<400> SEQUENCE: 11

Tyr Ala Ser Asn Leu Glu Ser
1               5

<210> SEQ ID NO 12
<211> LENGTH: 9
<212> TYPE: PRT
```

```
<213> ORGANISM: Mus sp.

<400> SEQUENCE: 12

Gln His Ser Trp Glu Ile Pro Tyr Thr
1               5

<210> SEQ ID NO 13
<211> LENGTH: 116
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Gln Ile Thr Leu Lys Glu Ser Gly Pro Thr Leu Val Lys Pro Thr Gln
1               5                   10                  15

Thr Leu Thr Leu Thr Cys Thr Val Ser Gly Phe Ser Leu Ser Thr Tyr
            20                  25                  30

Gly Val His Trp Ile Arg Gln Pro Pro Gly Lys Ala Leu Glu Trp Leu
        35                  40                  45

Gly Val Ile Trp Arg Gly Val Thr Thr Asp Tyr Asn Ala Ala Phe Met
    50                  55                  60

Ser Arg Leu Thr Ile Thr Lys Asp Asn Ser Lys Asn Gln Val Val Leu
65                  70                  75                  80

Thr Met Asn Asn Met Asp Pro Val Asp Thr Ala Thr Tyr Tyr Cys Ala
                85                  90                  95

Arg Leu Gly Phe Tyr Ala Met Asp Tyr Trp Gly Gln Gly Thr Leu Val
            100                 105                 110

Thr Val Ser Ser
        115

<210> SEQ ID NO 14
<211> LENGTH: 116
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Ile Phe Arg Ser Tyr
            20                  25                  30

Gly Met Ser Trp Val Arg Gln Ala Pro Gly Lys Gly Leu Glu Trp Val
        35                  40                  45

Ala Ser Ile Ser Ser Gly Gly Ser Thr Tyr Tyr Pro Asp Ser Val Lys
    50                  55                  60

Gly Arg Phe Thr Ile Ser Arg Asp Asn Ala Lys Asn Ser Leu Tyr Leu
65                  70                  75                  80

Gln Met Asn Ser Leu Arg Ala Glu Asp Thr Ala Val Tyr Asp Cys Ala
                85                  90                  95

Arg Gly Tyr Asp Ser Gly Phe Ala Tyr Trp Gly Gln Gly Thr Leu Val
            100                 105                 110

Thr Val Ser Ser
        115

<210> SEQ ID NO 15
```

<211> LENGTH: 107
<212> TYPE: PRT
<213> ORGANISM: Artificial Sequence
<220> FEATURE:
<223> OTHER INFORMATION: Description of Artificial Sequence: Synthetic peptide

<400> SEQUENCE: 15

Asp Ile Gln Met Thr Gln Ser Pro Ser Ser Leu Ser Ala Ser Val Gly
1               5                   10                  15
Asp Arg Val Thr Ile Thr Cys Lys Ala Ser Gln Ser Val Ser Asn Asp
            20                  25                  30
Val Ala Trp Tyr Gln Gln Lys Pro Gly Lys Ala Pro Lys Leu Leu Ile
        35                  40                  45
Tyr Tyr Ala Ala Asn Arg Tyr Thr Gly Val Pro Asp Arg Phe Ser Gly
    50                  55                  60
Ser Gly Tyr Gly Thr Asp Phe Thr Phe Thr Ile Ser Ser Leu Gln Pro
65                  70                  75                  80
Glu Asp Ile Ala Thr Tyr Phe Cys Gln Gln Asp Tyr Thr Ser Pro Tyr
                85                  90                  95
Thr Phe Gly Gln Gly Thr Lys Leu Glu Ile Lys
            100                 105

<210> SEQ ID NO 16
<211> LENGTH: 111
<212> TYPE: PRT
<213> ORGANISM: Artificial Sequence
<220> FEATURE:
<223> OTHER INFORMATION: Description of Artificial Sequence: Synthetic peptide

<400> SEQUENCE: 16

Asp Ile Val Leu Thr Gln Ser Pro Ala Ser Leu Ala Val Ser Pro Gly
1               5                   10                  15
Gln Arg Ala Thr Ile Thr Cys Arg Ala Ser Gln Ser Val Ser Thr Ser
            20                  25                  30
Ser Ser Ser Phe Met His Trp Tyr Gln Gln Lys Pro Gly Gln Pro Pro
        35                  40                  45
Lys Leu Leu Ile Lys Tyr Ala Ser Asn Leu Glu Ser Gly Val Pro Ala
    50                  55                  60
Arg Phe Ser Gly Ser Gly Ser Gly Thr Asp Phe Thr Leu Thr Ile Asn
65                  70                  75                  80
Pro Val Glu Ala Asn Asp Thr Ala Asn Tyr Tyr Cys Gln His Ser Trp
                85                  90                  95
Glu Ile Pro Tyr Thr Phe Gly Gln Gly Thr Lys Leu Glu Ile Lys
            100                 105                 110

<210> SEQ ID NO 17
<211> LENGTH: 446
<212> TYPE: PRT
<213> ORGANISM: Artificial Sequence
<220> FEATURE:
<223> OTHER INFORMATION: Description of Artificial Sequence: Synthetic peptide

<400> SEQUENCE: 17

Gln Ile Thr Leu Lys Glu Ser Gly Pro Thr Leu Val Lys Pro Thr Gln
1               5                   10                  15
Thr Leu Thr Leu Thr Cys Thr Val Ser Gly Phe Ser Leu Ser Thr Tyr
            20                  25                  30

-continued

Gly Val His Trp Ile Arg Gln Pro Gly Lys Ala Leu Glu Trp Leu
         35                  40                  45
Gly Val Ile Trp Arg Gly Val Thr Thr Asp Tyr Asn Ala Ala Phe Met
 50                  55                  60
Ser Arg Leu Thr Ile Thr Lys Asp Asn Ser Lys Asn Gln Val Val Leu
 65                  70                  75                  80
Thr Met Asn Asn Met Asp Pro Val Asp Thr Ala Thr Tyr Tyr Cys Ala
                 85                  90                  95
Arg Leu Gly Phe Tyr Ala Met Asp Tyr Trp Gly Gln Gly Thr Leu Val
            100                 105                 110
Thr Val Ser Ser Ala Ser Thr Lys Gly Pro Ser Val Phe Pro Leu Ala
        115                 120                 125
Pro Ser Ser Lys Ser Thr Ser Gly Gly Thr Ala Ala Leu Gly Cys Leu
130                 135                 140
Val Lys Asp Tyr Phe Pro Glu Pro Val Thr Val Ser Trp Asn Ser Gly
145                 150                 155                 160
Ala Leu Thr Ser Gly Val His Thr Phe Pro Ala Val Leu Gln Ser Ser
                165                 170                 175
Gly Leu Tyr Ser Leu Ser Ser Val Val Thr Val Pro Ser Ser Ser Leu
            180                 185                 190
Gly Thr Gln Thr Tyr Ile Cys Asn Val Asn His Lys Pro Ser Asn Thr
        195                 200                 205
Lys Val Asp Lys Lys Val Glu Pro Lys Ser Cys Asp Lys Thr His Thr
210                 215                 220
Cys Pro Pro Cys Pro Ala Pro Glu Leu Leu Gly Gly Pro Ser Val Phe
225                 230                 235                 240
Leu Phe Pro Pro Lys Pro Lys Asp Thr Leu Met Ile Ser Arg Thr Pro
                245                 250                 255
Glu Val Thr Cys Val Val Val Ala Val Ser His Glu Asp Pro Glu Val
            260                 265                 270
Lys Phe Asn Trp Tyr Val Asp Gly Val Glu Val His Asn Ala Lys Thr
        275                 280                 285
Lys Pro Arg Glu Glu Gln Tyr Asn Ser Thr Tyr Arg Val Val Ser Val
290                 295                 300
Leu Thr Val Leu His Gln Asp Trp Leu Asn Gly Lys Glu Tyr Lys Cys
305                 310                 315                 320
Lys Val Ser Asn Lys Ala Leu Pro Ala Pro Ile Glu Lys Thr Ile Ser
                325                 330                 335
Lys Ala Lys Gly Gln Pro Arg Glu Pro Gln Val Tyr Thr Leu Pro Pro
            340                 345                 350
Ser Arg Asp Glu Leu Thr Lys Asn Gln Val Ser Leu Thr Cys Leu Val
        355                 360                 365
Lys Gly Phe Tyr Pro Ser Asp Ile Ala Val Glu Trp Glu Ser Asn Gly
370                 375                 380
Gln Pro Glu Asn Asn Tyr Lys Thr Thr Pro Pro Val Leu Asp Ser Asp
385                 390                 395                 400
Gly Ser Phe Phe Leu Tyr Ser Lys Leu Thr Val Asp Lys Ser Arg Trp
                405                 410                 415
Gln Gln Gly Asn Val Phe Ser Cys Ser Val Met His Glu Ala Leu His
            420                 425                 430
Asn His Tyr Thr Gln Lys Ser Leu Ser Leu Ser Pro Gly Lys
        435                 440                 445

```
<210> SEQ ID NO 18
<211> LENGTH: 214
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Asp Ile Gln Met Thr Gln Ser Pro Ser Ser Leu Ser Ala Ser Val Gly
1               5                   10                  15

Asp Arg Val Thr Ile Thr Cys Lys Ala Ser Gln Ser Val Ser Asn Asp
            20                  25                  30

Val Ala Trp Tyr Gln Gln Lys Pro Gly Lys Ala Pro Lys Leu Leu Ile
        35                  40                  45

Tyr Tyr Ala Ala Asn Arg Tyr Thr Gly Val Pro Asp Arg Phe Ser Gly
    50                  55                  60

Ser Gly Tyr Gly Thr Asp Phe Thr Phe Thr Ile Ser Ser Leu Gln Pro
65                  70                  75                  80

Glu Asp Ile Ala Thr Tyr Phe Cys Gln Gln Asp Tyr Thr Ser Pro Tyr
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 19
<211> LENGTH: 446
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Glu Val Gln Leu Val Glu Ser Gly Gly Gly Leu Val Lys Pro Gly Gly
1               5                   10                  15

Ser Leu Arg Leu Ser Cys Ala Ala Ser Gly Phe Ile Phe Arg Ser Tyr
            20                  25                  30

Gly Met Ser Trp Val Arg Gln Ala Pro Gly Lys Gly Leu Glu Trp Val
        35                  40                  45

Ala Ser Ile Ser Ser Gly Gly Ser Thr Tyr Tyr Pro Asp Ser Val Lys
    50                  55                  60

Gly Arg Phe Thr Ile Ser Arg Asp Asn Ala Lys Asn Ser Leu Tyr Leu
65                  70                  75                  80

Gln Met Asn Ser Leu Arg Ala Glu Asp Thr Ala Val Tyr Asp Cys Ala
```

85                  90                  95
Arg Gly Tyr Asp Ser Gly Phe Ala Tyr Trp Gly Gln Gly Thr Leu Val
                100                 105                 110

Thr Val Ser Ser Ala Ser Thr Lys Gly Pro Ser Val Phe Pro Leu Ala
            115                 120                 125

Pro Ser Ser Lys Ser Thr Ser Gly Gly Thr Ala Ala Leu Gly Cys Leu
        130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
                180                 185                 190

Gly Thr Gln Thr Tyr Ile Cys Asn Val Asn His Lys Pro Ser Asn Thr
            195                 200                 205

Lys Val Asp Lys Lys Val Glu Pro Lys Ser Cys Asp Lys Thr His Thr
        210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Ala Val Ser His Glu Asp Pro Glu Val
                260                 265                 270

Lys Phe Asn Trp Tyr Val Asp Gly Val Glu Val His Asn Ala Lys Thr
            275                 280                 285

Lys Pro Arg Glu Glu Gln Tyr Asn Ser Thr Tyr Arg Val Val Ser Val
        290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
        370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly Lys
        435                 440                 445

<210> SEQ ID NO 20
<211> LENGTH: 218
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

```
Asp Ile Val Leu Thr Gln Ser Pro Ala Ser Leu Ala Val Ser Pro Gly
 1               5                  10                  15

Gln Arg Ala Thr Ile Thr Cys Arg Ala Ser Gln Ser Val Ser Thr Ser
            20                  25                  30

Ser Ser Ser Phe Met His Trp Tyr Gln Gln Lys Pro Gly Gln Pro Pro
        35                  40                  45

Lys Leu Leu Ile Lys Tyr Ala Ser Asn Leu Glu Ser Gly Val Pro Ala
 50                  55                  60

Arg Phe Ser Gly Ser Gly Ser Gly Thr Asp Phe Thr Leu Thr Ile Asn
 65                  70                  75                  80

Pro Val Glu Ala Asn Asp Thr Ala Asn Tyr Tyr Cys Gln His Ser Trp
                85                  90                  95

Glu Ile Pro Tyr Thr Phe Gly Gln Gly Thr Lys Leu Glu Ile Lys Arg
            100                 105                 110

Thr Val Ala Ala Pro Ser Val Phe Ile Phe Pro Pro Ser Asp Glu Gln
            115                 120                 125

Leu Lys Ser Gly Thr Ala Ser Val Val Cys Leu Leu Asn Asn Phe Tyr
        130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
    210                 215

<210> SEQ ID NO 21
<211> LENGTH: 442
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Gln Ile Thr Leu Lys Glu Ser Gly Pro Thr Leu Val Lys Pro Thr Gln
 1               5                  10                  15

Thr Leu Thr Leu Thr Cys Thr Val Ser Gly Phe Ser Leu Ser Thr Tyr
            20                  25                  30

Gly Val His Trp Ile Arg Gln Pro Pro Gly Lys Ala Leu Glu Trp Leu
        35                  40                  45

Gly Val Ile Trp Arg Gly Val Thr Thr Asp Tyr Asn Ala Ala Phe Met
 50                  55                  60

Ser Arg Leu Thr Ile Thr Lys Asp Asn Ser Lys Asn Gln Val Val Leu
 65                  70                  75                  80

Thr Met Asn Asn Met Asp Pro Val Asp Thr Ala Thr Tyr Tyr Cys Ala
                85                  90                  95

Arg Leu Gly Phe Tyr Ala Met Asp Tyr Trp Gly Gln Gly Thr Leu Val
            100                 105                 110

Thr Val Ser Ser Ala Ser Thr Lys Gly Pro Ser Val Phe Pro Leu Ala
        115                 120                 125

Pro Cys Ser Arg Ser Thr Ser Glu Ser Thr Ala Ala Leu Gly Cys Leu
        130                 135                 140
```

```
Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Lys Thr Tyr Thr Cys Asn Val Asp His Lys Pro Ser Asn Thr
        195                 200                 205

Lys Val Asp Lys Arg Val Glu Ser Lys Tyr Gly Pro Pro Cys Pro Pro
    210                 215                 220

Cys Pro Ala Pro Glu Ala Ala Gly Gly Pro Ser Val Phe Leu Phe Pro
225                 230                 235                 240

Pro Lys Pro Lys Asp Thr Leu Met Ile Ser Arg Thr Pro Glu Val Thr
                245                 250                 255

Cys Val Val Val Asp Val Ser Gln Glu Asp Pro Glu Val Gln Phe Asn
            260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
    290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
            340                 345                 350

Glu Met Thr Lys Asn Gln Val Ser Leu Thr Cys Leu Val Lys Gly Phe
        355                 360                 365

Tyr Pro Ser Asp Ile Ala Val Glu Trp Glu Ser Asn Gly Gln Pro Glu
    370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
            420                 425                 430

Thr Gln Lys Ser Leu Ser Leu Ser Leu Gly
        435                 440
```